United States Patent [19]

Nunley et al.

[11] 4,404,649

[45] Sep. 13, 1983

[54] DOCUMENT PROCESSING SYSTEM

[75] Inventors: Leonard J. Nunley; Willis D. Simpson, both of Dallas; William J. Reid, Richardson, all of Tex.

[73] Assignee: Recognition Equipment Incorporated, Irving, Tex.

[21] Appl. No.: 202,970

[22] Filed: Nov. 3, 1980

[51] Int. Cl.³ .............................................. G06F 15/30
[52] U.S. Cl. ...................................... 364/900; 235/379
[58] Field of Search ... 364/200 MS File, 900 MS File, 364/408; 235/379, 425, 449, 493

[56] References Cited

U.S. PATENT DOCUMENTS

| | | | |
|---|---|---|---|
| 3,178,690 | 4/1965 | Masters et al. | 364/200 |
| 3,228,006 | 1/1966 | Neilson et al. | 364/200 |
| 3,277,444 | 10/1966 | Masters | 364/200 |
| 3,308,439 | 3/1967 | Tink et al. | 364/200 |
| 3,596,256 | 7/1971 | Alpert et al. | 364/200 |
| 3,970,992 | 7/1976 | Boothroyd et al. | 364/900 |
| 3,998,155 | 12/1976 | Cothran et al. | 364/200 X |
| 4,025,905 | 5/1977 | Gorgens | 364/900 |
| 4,027,142 | 5/1977 | Paup et al. | 235/379 |
| 4,082,945 | 4/1978 | Van de Goor et al. | 235/379 |
| 4,091,448 | 5/1978 | Clausing | 364/200 |
| 4,166,945 | 9/1979 | Inoyama et al. | 235/379 |
| 4,180,799 | 12/1979 | Smith | 340/146.3 |

Primary Examiner—Raulfe B. Zache
Attorney, Agent, or Firm—Richards, Harris & Medlock

[57] ABSTRACT

The system described herein provides a capability for automatically processing documents such as bank checks, deposit slips, loan payments, etc., from all points within a banking organization, with exception of the point of receipt, based on the utilization of a Source Item Control Number (SICN), which uniquely identifies a document at all subsequent processing points. Processing at the source point of receipt is semi-automatic in that the first person to handle the document within the organization is generally required to key or otherwise manually enter certain data related to the document.

9 Claims, 9 Drawing Figures

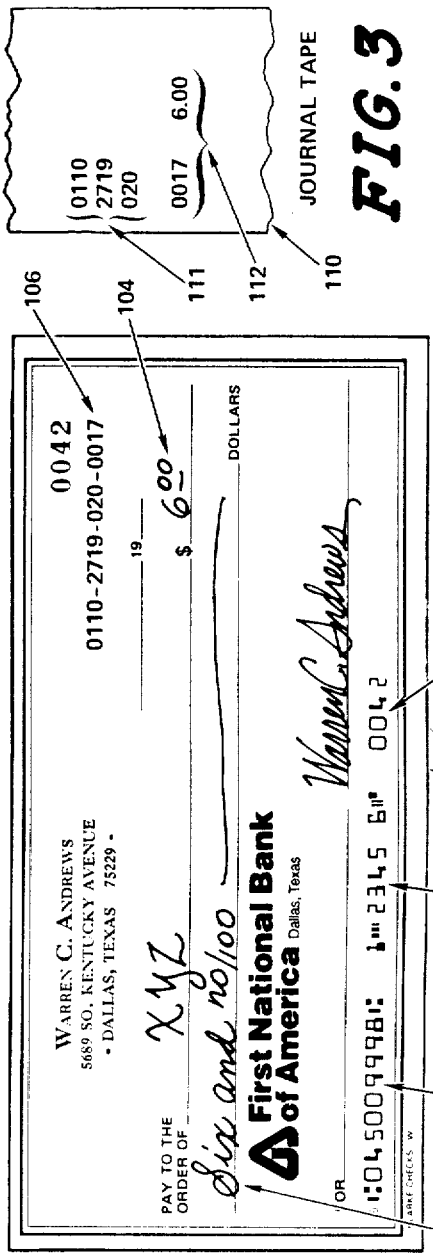
FIG. 3 JOURNAL TAPE
FIG. 4 RECORD FOR CHECK NO. 0042
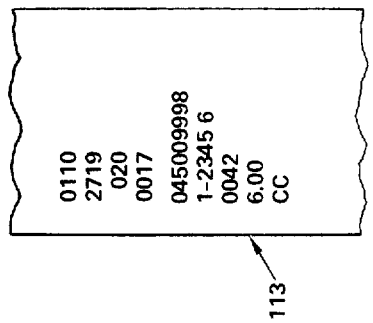
FIG. 2
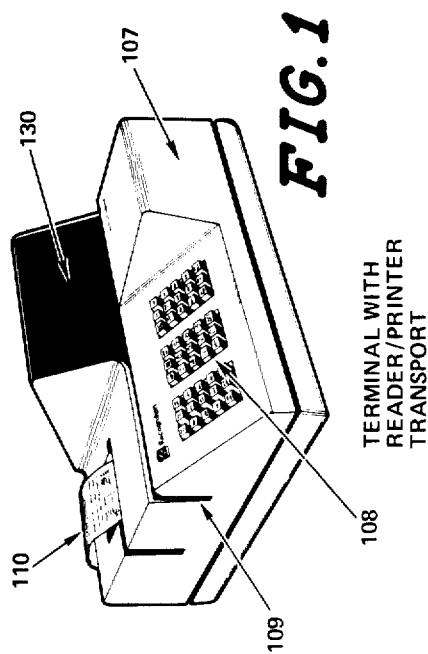
FIG. 1 TERMINAL WITH READER/PRINTER TRANSPORT

DOCUMENT PROCESSING SYSTEM

FIELD OF INVENTION

This invention relates to document handling systems and more particularlly to an automatic process for handling such documents based on the utilization of a Source Item Control Number.

PRIOR ART

In the processing of documents such as bank checks and other similar documents handled within banking systems, there is generally a need to accomplish two basic objectives. First, there is a need to capture certain information from the document or related to the document which is read into an accounting system in order that bookkeeping operations for the organization can be carried out under automated control and in accordance with established and well known principles. Second, there is a need to distribute the documents. This distribution, depending upon the type of document, may consist of returning the document to the person who initially created it, or sending it to another organization, or sending it to some group within the processing organization for filing or for other operations based upon the document. In the special case of bank checks sent by one bank organization to another bank organization, there is also a need for the distributing bank to encode the checks in Magnetic Ink Character Recognition (MICR) format so that the receiving bank can utilize any of a number of existing machines which are capable of reading the data from the checks including bank number, account number, amount, etc., into an accounting system in order that bookkeeping operations can be carried out without the need to manually enter any data from the check. Such machines to read MICR format data from documents are available, and all operate in accordance with well known and established principles.

In the processing of documents such as bank checks by the financial institutions, batch oriented document processing systems are typically employed for capturing data from and sorting the documents utilizing the information read therefrom. Various methods and systems for sorting and tracing documents are well known. Typical systems are described in U.S. Pat. No. 3,815,102, entitled "Method and Apparatus For Item Tracking;" U.S. Pat. No. 3,460,673, entitled "Document Sorting Apparatus;" and U.S. Pat. No. 4,027,142, entitled "Automated Processing Of Financial Documents".

Each of the above mentioned prior art patents describe systems useful in the handling of financial documents; however, they do not provide capability of initial source coding of the document or automatic exception item handling of the documents. The above mentioned process is usually done off line from automatic processing and is very time consuming.

Typically many documents and the data related thereto may be manually keyed several times during handling by the same organization. For example, a bank teller may manually key the account number and amount from a check into a computer terminal or a telephone key pad to access an accounting system data base to determine if the bank's rules for authorizing the check for cashing are met. The bank teller may then manually key the amount from the check again into a terminal or adding machine as part of a process to determine how much cash to return to the customer or if the total of all checks represented is correct. The same data may possibly be keyed into a data system by other persons including various balancing, reconcilliation, and reject reentry operations.

The advantages and technical advance represented by the invention may be best understood by reference to the following drawings.

FIG. 1 is an illustration of a terminal that may be used with the system of the present invention;

FIG. 3 is a journal tape which may be printed by the terminal of FIG. 1;

FIG. 4 illustrates an example of a record for a particular check;

FIG. 7 is a block diagram of a document handling reader/sorter system which may be a part of the processing system of FIG. 5;

SUMMARY OF THE INVENTION

Figure 5:
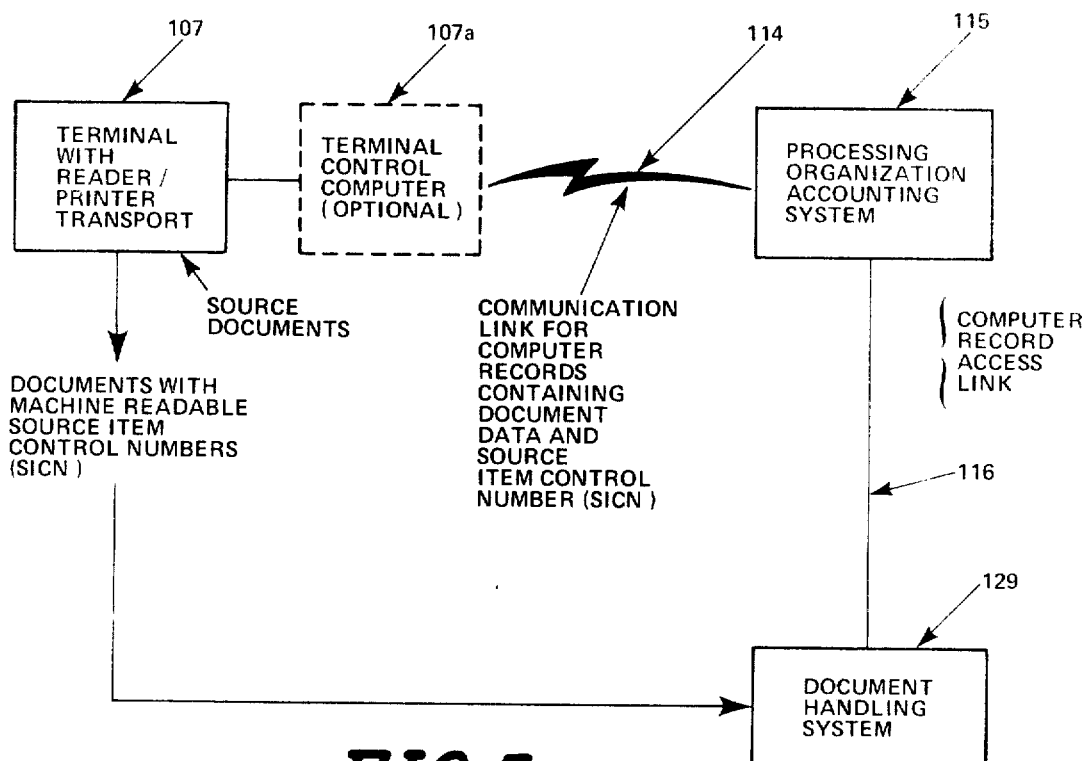
FIG. 5 is a block representation of a processing system according to the present invention.

In accordance with the present invention, a document such as a check may be presented to a teller for deposit or for payment. The teller would than place the check in a teller terminal which includes a reader/printer transport and causes to be encoded thereon the amount of the check and the unique number identified as a Source Item Control Number (SICN). This SICN specifically and uniquely identifies the document at all subsequent processing points within the system. The item information thus applied to the check and also information read from the check would be recorded within the data processing (accounting) system of the bank and is the data which is required for bookkeeping operations and for later processing of the check throughout the system. Subsequently, as the document is processed through a document processing system, the SICN is read from each document and a call is issued to obtain either the original record or information derived from the original record by the accounting system. The record or information is then utilized by the document transport system to perform one or more operations hereinafter described.

During the bookkeeping operations, whenever a document is identified as an exception item requiring special handling, an exception destination record for the item is entered into memory storage. Each of said exception destination records contain a Source Item Control Number and the address of the destination desired for the exception item document together with any other data deemed appropriate by the processing organization. As each document is processed, during any pass including first pass by a batch oriented document processing system, which has a reader to read the SICN assigned to the document, a call may be made to memory storage based on the SICN of the document to determine if the memory storage contains an exception destination record which includes the SICN. If such a record is present in memory storage, it is retrieved and utilized by the batch oriented document processing system to remove said document from the stream of documents and sort it to the address destination indicated as desired in said exception destination record. Also, during the bookkeeping operations, the accounting system may utilize the data from each record to generate address destination records which are placed in a memory storage. Each of said address destination records contain a source item control number and the address of the destination desired for the documents if they are not determined to be exception items together with any other data deemed appropriate by the processing organization.

Also, in the batch processing of documents to separate them according to destination or account, the SICN can be read from each document to determine if all necessary data concerning each of the documents have already been processed into the system and stored in memory. It may thus be determined if all of the documents entered at a specific time have been received for separation and that none of the documents have been misplaced or lost. If there are any SICN's assigned to documents that have not been run through batch processing at the appropriate state, then the system can be alerted that certain items have not been processed. If a particular document did not contain a SICN, this would also alert the system to the fact that such document has not been completely processed through the system.

Referring to FIG. 1, there is illustrated a terminal system 107 with a keyboard, 108. Such a system might be used to process the check illustrated in FIG. 2. The front of the check 100 has been illustrated comprising three MICR fields 101, 102 and 103. Field 101 is a bank number field. Field 102 is an account number field. Field 103 is a transaction code field which, in the illustration, consists of the check serial number. The amount of the check is indicated in areas 104 and 105. The check 100 thus illustrated (without the SICN 106) represents a typical check which might be submitted to a bank teller for cashing, depositing, etc.

To process this check using the subject invention, the teller would look at the check 100, and using the keyboard 108 of terminal 107, would key the amount 104 or 105 from the face of the check. The teller would also typically key data indicating the type of transaction being performed which in this case is assumed to be "check cash." The teller would then insert the check 100 into a reader/printer transport 109, which is a part of the terminal 107. The reader/printer transport 109 automatically moves the document past a reader device (not shown) which is capable of reading MICR format fields 101-103. The data read from the face of the check together with the keyed amount and the type of transaction become part of the computer record 113 (FIG. 4) created by the terminal 107 for check 100. The terminal 107 then automatically assigns a unique SICN 106 to the check based on data in the terminal central control system which was previously entered by the teller or built into the terminal or both. In the example shown, the first four digits of the SICN might identify that this check was processed by a terminal located in branch number 110. The next four digits of the SICN might represent the teller's employee number or other identification (employee number 2719). The next three digits of the SICN might represent the data (020 the twentieth day of the year) on which this document is processed.

The next four digits might represent the sequence number of this item (the seventeenth item processed by this teller on this terminal today). Many other formats of SICN are possible. The SICN might be shorter or longer and might contain other data, but the SICN assigned to a document will not be assigned to any other document for a significant period of time. As an example, not for one year or longer. There are many ways to assure the necessary uniqueness for the SICN.

Figure 2:
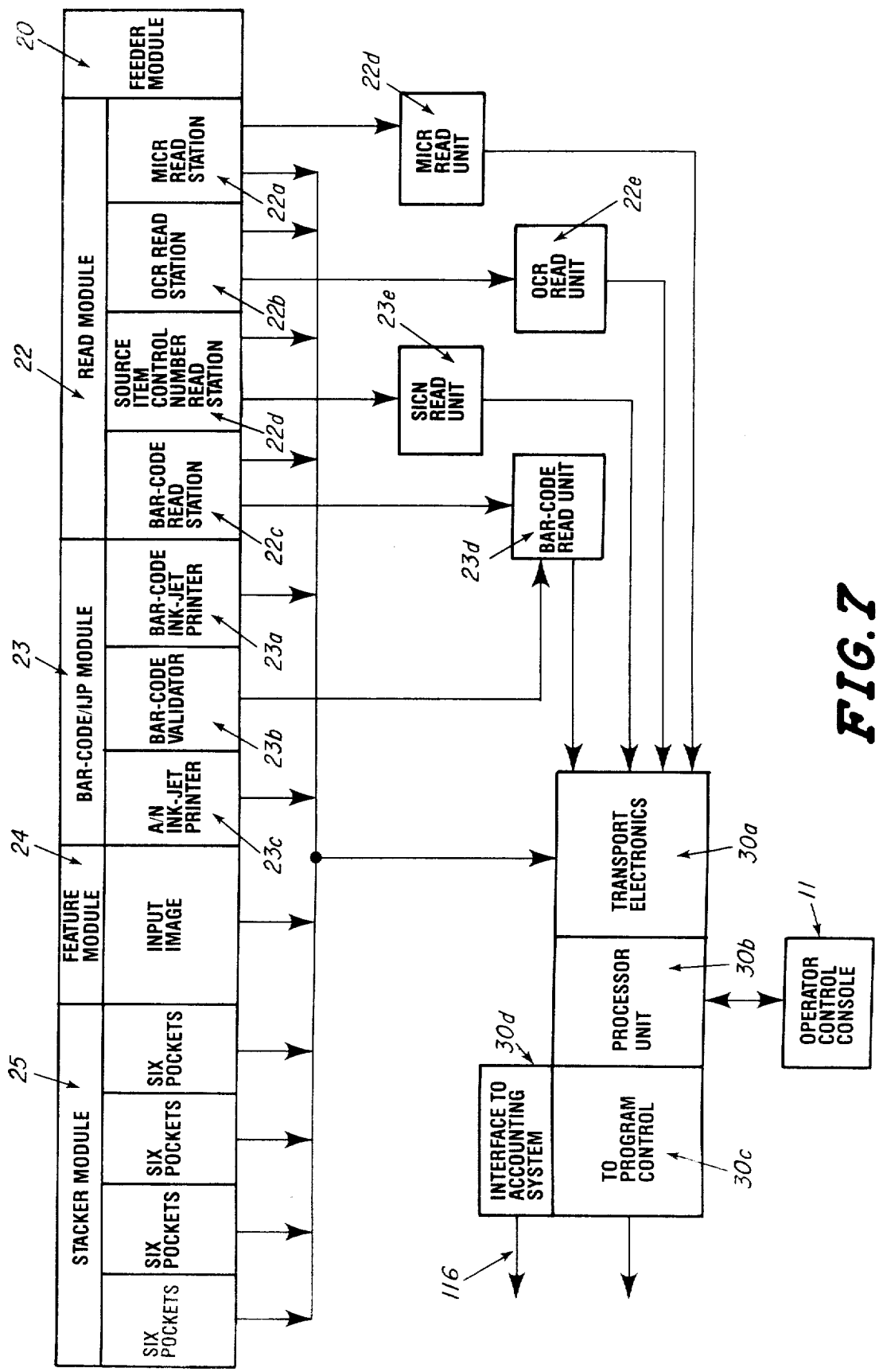
FIG. 2 is a representation of a bank check illustrating one position of a Source Item Control Number and other data thereon.

The terminal 107 also operates to cause the SICN 106 to become a part of the computer record 113 for check 100. The reader/printer transport 109 of the terminal also moves the document past a printer device which prints the SICN 106 on the face of the check, as illustrated in FIG. 2, in a machine readable code which is also, preferably, human readable.

The computer record which is created by the terminal 107 for the check may contain more or less data than the example 113 illustrated in FIG. 4. The exact data and format of such computer records are based upon the processing organizations requirements for proper handling when read into their accounting system. It is important to this invention, however, that the computer record created by terminal 107 contain at least the following data:

All or part of the data read from the document by the reader of terminal 107, all data relative to the document which was keyed manually by the terminal operator using keyboard 108, and a SICN which is sufficiently unique to avoid confusing the associated document with any other document during subsequent processing. These minimum data requirements in the computer record for a given document are essential to assure that all further processing of the document which is required, based on the procedures of the processing organization, may be accomplished by automatic means without the need for any additional manual entries of data obtained from the document.

FIG. 3 illustrates a journal tape record 110 created by the terminal 107. As illustrated, this journal tape record contains all the data 111 and 112 which is contained on the face of the document in areas 104-106. Data from areas 101-103 and other data could also be included. This journal tape record is shown for reference only and is not essential to the invention.

Referring now to FIG. 5. There is illustrated a block diagram of an overall system for processing documents according to the present invention. Terminal 107, which is the same terminal illustrated in FIG. 1, may be operated alone or in conjunction with a terminal control computer 107a to perform the following basic functions for each document processed: (1) Create a computer record which contains a Source Item Control Number and all necessary data from the document, and transmit the computer record over a communication link 114 to the processing organization's accounting system 115, and (2) Print a machine readable Source Item Control Number on the document.

Once these basic functions have been performed by terminal 107, the processing organization has captured all of the data from the document related to the document, and has transferred the data into the accounting system 115, then bookkeeping operations for the organization may be carried out under automated control and in accordance with established and well known principles. Typically, all remaining processing operations performed on the document will relate to distributing the document based on the organization's procedures, or preparing the document for processing by another organization's system by encoding machine readable data on the document in MICR, bar code or some other suitable format. The document handling system 129 illustrated in FIG. 5 (several possible embodiments hereinafter described) includes means to access the computer records created by terminal 107 and stored in the accounting system 115, means to read the SICN encoded on documents by terminal 107, and means to match said source item control numbers so that the document may be processed based on data acquired from said computer records.

Figure 6:
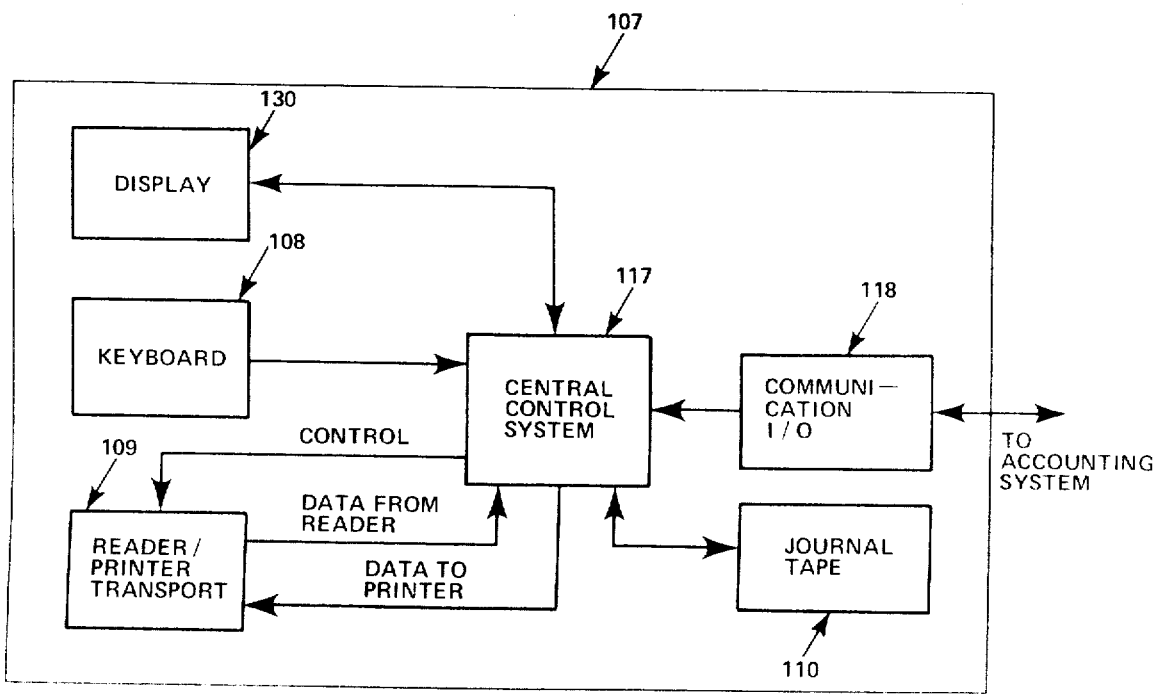
FIG. 6 is a block diagram of a terminal with reader/printer transport as shown in FIG. 1 which may be part of the processing system of FIG. 5.

Referring now to FIG. 6. There is illustrated a block diagram of the terminal 107 which is part of the processing system utilized in subject invention. Keyboard 108 and display 130 are the type devices found in many computer terminals and are well known in the art. The reader/printer transport 109 may be of the type described and claimed in U.S. Pat. No. 4,196,846 entitled "Document Processing Transport." The reader/printer transport 109 includes means for entering documents into a feed station, moving the documents past at least one read station, transmitting data read and/or manually entered by keyboard 108 to central control system 117 and then moving the document through a print station with provision for utilizing said data from central control system 117 and printing said data upon the document in a machine readable code. The MICR format characters may be read into the system by the reader means of reader/printer transport 109 using the principal of magnetic sensing. Such a reader is described in U.S. Pat. No. 4,196,846.

The reader means of reader/printer transport 109 could also operate on optical character recognition principles which are well known.

The central control system 117 is not unlike that found in many computer terminals. It must have the capability, however, to control the reader/printer transport 109 and to generate a Source Item Control Number. The communication I/O 118 shown in FIG. 6 is of the type which operates in accordance with well known and established principles.

Now referring to FIG. 7 which is a block diagram of a document handling reader/sorter system which may be the document handling system 129 part of the processing system used in the present application. The reader/sorter illustrated is of the type described in U.S. Pat. No. 4,027,142, entitled "Automated Processing of Financial Documents" wherein a system is described for the automatic processing of bank checks encoded with alphanumeric characters on the face of each check by transmitting the checks through a processor to a sorter while at a first station generating an item control number unique to each document and a second station sensing each character in the encoded line to produce a string of data signals for each document. At a third station the control number and other data is imprinted on the back of each document in code form and the control number and the outer data is imprinted on the face of each document in human readable form.

FIG. 7 provides an overall view of the functional aspects of a document handling reader/sorter system which includes items in addition to those in the above U.S. patent as follows: A Source Item Control Number Read Station 22d, a Source Item Control Number Read Unit 23e, and an Interface 30d to the Processing Organization Accounting System 115 as shown in FIG. 5 through a computer record access link 116 as illustrated in FIG. 5.

With these additions, the system shown in FIG. 7 can perform all of the functions described in U.S. Pat. No. 4,027,142, even if the MICR read station 22a and the OCR read station 22b were not included in the system. This is accomplished by utilizing the Source Item Control Number read station 22d together with the Source Item Control Number read unit 23e to read the sorce item control numbers printed on the documents by terminal 107, and matching these numbers to the computer records containing the same source item control numbers which were created by terminal 107 and passed through the communication link 114 to the processing organization accounting system 115, and then to the processor unit 30b, through the computer record interface link 116 and the interface to accounting system 30d. All of the processes related to transmission of the computer records with the SICN created by terminal 107 to the processor unit 30b and the matching of these records to the SICN read by the reader/sorter system may be accomplished in accordance with established and well known principles. It must be noted that there is no need to encode characters in MICR format on the documents to be processed by the system shown in FIG. 7, as was previously required to allow the system to perform it's intended functions of document sorting and distribution.

Figure 8:
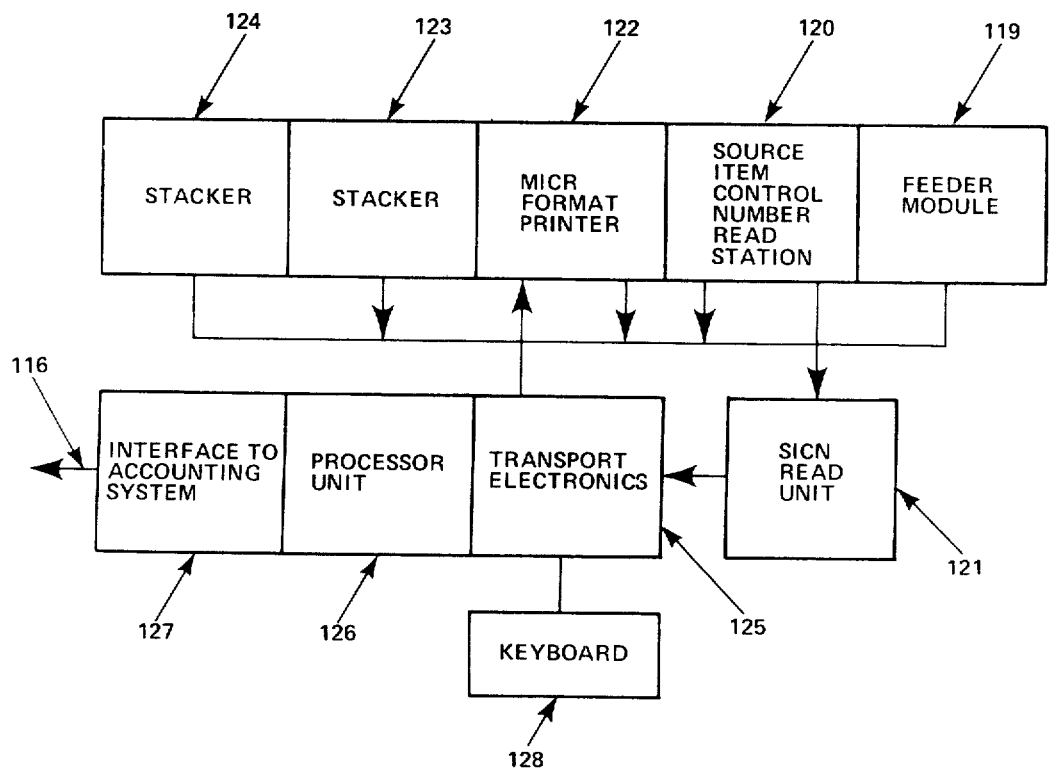
FIG. 8 is a block diagram of a document handling automatic encoder system which may be a part of the processing system of FIG. 5.

FIG. 8 provides an overall view of the functional aspects of a document handling automatic encoder system which may be the document handling system 129 part of the processing system and which can utilize the computer records 113 including source item control numbers created by terminal 107 and to automatically encode documents in MICR format.

The operation of the system of FIG. 8 is basically as follows. A group of documents from one source such as a particular terminal operated by a particular operator are brought to the system. An operator looks at one item or a header document and using keyboard 128 requests the accounting computer 115 to transmit all computer records or alternatively all encoder control records for the group of documents through link 116, and interface 127 into processor unit 126. The group of documents is then processed by feeding them into the system using feeder 119, and transporting them past the source item control number read station 120, and the MICR format printer 122 into stackers 123 and 124. As the items are transported, the source item control numbers are read by the SICN read unit 121 which utilizes the transport electronics 125 to access the computer records created by terminal 107 and stored in processor unit 126. As the computer records are accessed on the basis of matching SICN, the amount data (and possibly other data) is extracted from the computer record, and forwarded to the MICR format printer 122 through transport electronics 125. Alternatively, encoder control records generated by the accounting system may be utilized directly. The appropriate data is then printed on the document in MICR format by MICR format printer 122. As a third alternative, the SICN printer might have been utilized to print data to be encoded by the MICR format printer 122 directly on the document. In this event, printing of MICR format may be accomplished without any access to the accounting system.

During the processing of the documents on the system of FIG. 8, if additional data is necessary on the document or if there is an error in earlier applied data, the operator, via keyboard 128, may add the new data or correct the data that is in error.

Figure 9:
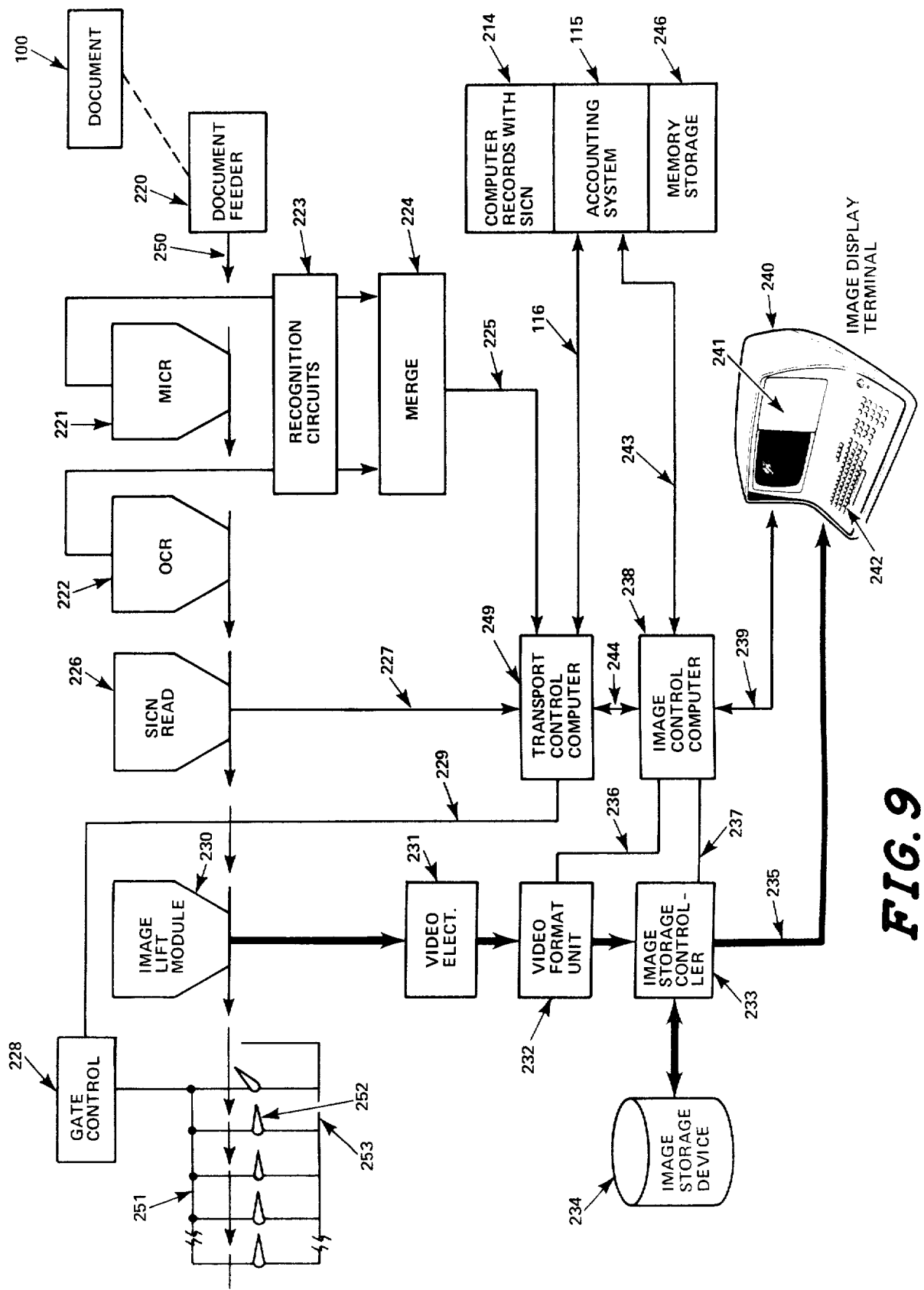
FIG. 9 is a block diagram of another document handling system which may be a part of the processing system shown in FIG. 5.

Referring back to FIG. 5, the document handling system 129 may be incorporated into the system as illustrated in FIG. 9 which may also include an image storage system. FIG. 9 illustrates a batch oriented document handling system. A document feeder 220 starts a document such as 100 shown in FIG. 2 along a path beginning at point 250, a MICR reader head 221 and an OCR reader head 222, a Source Item Control Number Reader 226 and an image lift module 230 are associated with the face of the documents at successive down stream locations.

Output signals from the MICR read head 221 and the OCR read head 222 are processed through recognition circuits 223 and applied to a merge unit 224. In accordance with known techniques, the two inputs to merge unit 224 are employed to produce a single output data stream to the transport control computer 249 on bus 225 which contains the data from fields such as 101-103 (FIG. 2). Output signals from the SICN read head 226 representing the data in SICN field 106 are applied to the transport control computer 249 over bus 227.

Transport control computer 249 operating in accordance with known techniques combines the data on bus 227 with the data on bus 225, if present, to produce a data record containing data from MICR fields such as 101-103 and the SICN for the document from which said MICR field data is obtained. The data on bus 225 may be utilized by transport control computer to determine a destination for each document. Control of sorting and tracking documents may be carried out in accordance with known methods and systems. Suitable methods are described and claimed in U.S. Pat. No. 3,815,102 entitled "Method and Apparatus for Item Tracking" and U.S. Pat. No. 3,460,673 entitled "Document Sorting Apparatus."

If a character appearing in MICR fields such as 101-102 where data is known to exist is not successfully identified by the recognition circuits 223, the transport control computer 249 upon determining this fact transmits the SICN of the document containing said character together with the characters which were identified successfully to the image control computer 238 over bus 244. If the character which was not successfully identified is one which is required to determine the sort destination for said document, the transport control computer 249 also transmits a signal over bus 229 to gate control 228 to actuate the reject gate 252 to divert the document to bin 253.

As previously described, computer records 113 are transmitted over a communications link 114 to accounting system 115. Accounting system 115 performs bookkeeping operations and subsequently determines which documents are to be classified as exception items requiring special handling. Accounting system 115 constructs a file in memory storage 246 containing an exception handling record for each document so classified which contains at least the SICN for each said document and data describing what type of special handling is required. Said file of exception handling records is transmitted from memory storage 246 through accounting system 115 to the transport control computer 249 over link 116. It is to be understood that link 116 may be an electrical connection or alternatively may consist of other conventional techniques utilized to transfer data from one computer to another such as a reel of magnetic tape, etc. The file of exception handling records is in turn transmitted over bus 244 to the image control computer 238. Alternatively, said file could be transmitted directly over link 243.

Output signals from the image lift module 230 representing a plurality of pixels or cells which in aggregate form a representation (image) of each document passing said image lift module 230 are processed through video electronics 231 and video format unit 232 to image storage controller 233 which causes said images to be stored in an image storge device 234 under control of image control computer 238 which sends control messages over bus 236 to the video format unit 232 and over bus 237 to the image storage controller 233. Typical control messages on bus 236 might contain instructions on coding formats for compression, instructions to retain only certain areas of the image, instructions for image segmentation to optimize storage requirements, etc.

Typical control messages on bus 237 might contain instructions as to which images should be stored (for example: store only images for which an exception handling record exists in image control computer 238), instructions as to the exact location within image storage device 234 where the image is to be stored, etc.

Concurrent with (or subsequent to) the storage of images in image storage device 234, image control computer 238 issues instructions over bus 237 to image storage controller 233 as to a sequence of images which are to be transmitted to the image display terminal 240 to be displayed on screen 241. These instructions may be automatically based on algorithms operating in image control computer 238, or alternatively, an operator through keyboard 242 may call upon an image or a block of images for display by keying the starting and ending (if more than one) SICN of the documents desired for special handling. For this purpose, the images stored in image storage device 234 are placed in a buffer memory which is part of image display terminal 240. The image of one or more documents are then displayed on screen 241 together with the exception handling record for the document. The operator then performs the special handling functions and makes disposition decisions using the image of the document on screen 241 in exactly the same manner as would be used if the physical document were present. If the function performed by the operator is a decision (such as "pay this item", "item is a stop pay item" etc.), the decision is entered by the operator using keyboard 242, transmitted over bus 239 to the image control computer 238 and then ultimately to the accounting system over bus 243 or link 244, 249, 116. The SICN of any item to be segregated in subsequent passes through the document handling system are likewise transmitted to transport control computer 249. If the function performed by the operator is to correct a character or characters appearing in MICR fields such as 101-103 not successfully identified by the recognition circuits 223, the process proceeds somewhat differently.

For documents requiring correction of unsuccessfully identified character, the image control computer 238 also sends a data record for all characters (successfully and unsuccessfully identified) to image display terminal 240. The characters contained in such data records are displayed on screen 241 together with the image of the document. The image control computer 238 is able to align these characters on the display screen in such a manner that successfully identified characters appear immediately above or below the corresponding characters in the image. The operator is thus able to utilize the combined image/character display to quickly locate characters which were not successfully identified. The operator then manually enters the data for such characters on keyboard 242 in succession. When all such characters have been corrected in this manner, a corrected data record is transmitted back to the accounting system 115 in the manner previously described for decision transmission.

Although the document handling system described by FIG. 9 herein has been limited to a specific embodiment and only one image display terminal has been illustrated, it is to be understood that many image display terminals may be interconnected with a single system. Similarly, it should be understood that many input terminals, such as terminal 107 could be connected to a single processing system though only one is illustrated in FIG. 5, and that other peripheral equipment for use in the receiving, recording, and correcting and distribution of documents could be used in conjunction with this system without departing from the true scope of this invention.

What is claimed:

1. A system for processing documents having machine readable characters on the face of each document and for assigning a number unique to the document, comprising; terminal means for automatically and manually capturing data from documents, means within said terminal for generating a unique source item identification number of each document, the derviation of said identification number based in part upon the particular terminal usd, printer means within said terminal for printing the source item identification number on each document along with data manually input to said terminal, storage means in said terminal for creating a record for each document which may include all or part of the data captured from the document and the source item identification number, a controller unit for controlling the function of each of the above means and coordinating the operation of said terminal, and means interconnected with said controller means for transmitting the record of each document to an accounting system.

2. The system according to claim 1 including a document handling means on said terminal and controled by said controller unit comprising, means for reading the source item identification number from documents, means to access said data captured from each document and stored in said memory means, means to match the source item control number with the data therefore, and means to distribute and/or sort documents according to information obtained from said records.

3. The system according to claim 1 wherein said means for manually and automatically capturing data includes a keyboard and a MICR format reader.

4. The system according to claim 1 wherein said printing means includes means for printing bar code format and/or MICR format.

5. The system according to claim 1 wherein said means for generating a source item identification number produces indicia representative of at least one of the following: date, terminal means generating the source item identification number, and person operating said terminal means.

6. The system according to claim 5 including means to alter the means for generating a source item identification number when a different person begins to operate said terminal means.

7. A system for processing documents having machine readable characters on the face of each document and for assinging a number unique to the document, comprising a document feed station and a document path, means for moving the document along said document path past at least on read station for reading at least some of the characters on the face of the documents, a print station for printing information on the document derived from the reading or characters, manually inputing information to the system, or from some other source, control means for directing the system through the feed, read and print steps required by the system, means for generating a source item identification number based on the information read from the document manually input into the system, and/or from said other source, which number is printed on said document, and an interface electronics for interfacing this system with storage means for recording the information read from and/or printed on the document and for relaying said information to an accounting system.

8. The system according to claim 7 including a keyboard interconnected with said control means to permit entering data into the system to be recorded on the document or to be entered into the storage means.

9. The system according to claim 7 including a plurality of stacker modules along said document path for separating documents according to a predetermined sort pattern.

* * * * *

UNITED STATES PATENT AND TRADEMARK OFFICE
CERTIFICATE OF CORRECTION

PATENT NO. : 4,404,649

DATED : September 13, 1983

INVENTOR(S) : Nunley et al.

It is certified that error appears in the above—identified patent and that said Letters Patent is hereby corrected as shown below:

Column 2, line 34, change "than" to --then--.
    Column 9, line 30, change "of each" to --for each--.
    Column 10, line 25, change "on" to --one--.

Signed and Sealed this

Third Day of January 1984

[SEAL]

Attest:

GERALD J. MOSSINGHOFF

Attesting Officer                Commissioner of Patents and Trademarks

REEXAMINATION CERTIFICATE (2211th)
United States Patent [19]
Nunley et al.

[11] B1 4,404,649
[45] Certificate Issued Feb. 8, 1994

[54] DOCUMENT PROCESSING SYSTEM

[75] Inventors: Leonard J. Nunley; Willis D. Simpson, both of Dallas; William J. Reid, Richardson, all of Tex.

[73] Assignee: Recognition Equipment Incorporated, Irving, Tex.

Reexamination Request:
No. 90/002,506, Nov. 12, 1991

Reexamination Certificate for:
Patent No.: 4,404,649
Issued: Sep. 13, 1983
Appl. No.: 202,970
Filed: Nov. 3, 1980

Certificate of Correction issued Jan. 3, 1984.

[51] Int. Cl.$^5$ ............................................. G06F 15/30
[52] U.S. Cl. ................................... 364/419; 235/379; 364/DIG. 2
[58] Field of Search ................. 364/408, 419, DIG. 2; 235/379, 425, 449, 493; 382/7

[56] References Cited
U.S. PATENT DOCUMENTS

| | | | |
|---|---|---|---|
| 3,988,571 | 10/1976 | Blair et al. | 235/379 |
| 4,027,142 | 5/1977 | Paup et al. | 235/379 |
| 4,082,945 | 4/1978 | van de Goor et al. | 235/379 |
| 4,201,978 | 5/1980 | Nally | 235/379 X |
| 4,264,808 | 4/1981 | Owens et al. | 235/379 |
| 4,277,689 | 7/1981 | Thomas et al. | 382/7 |
| 4,387,639 | 6/1983 | Brown et al. | 101/2 |
| 4,396,902 | 8/1983 | Warthan et al. | 382/64 |

*Primary Examiner*—Roy N. Envall, Jr.

[57] ABSTRACT

The system described herein provides a capability for automatically processing documents such as bank checks, deposit slips, loan payments, etc., from all points within a banking organization, with exception of the point of receipt, based on the utilization of a Source Item Control Number (SICN), which uniquely identifies a document at all subsequent processing points. Processing at the source point of receipt is semiautomatic in that the first person to handle the document within the organization is generally required to key or otherwise manually enter certain data related to the document.

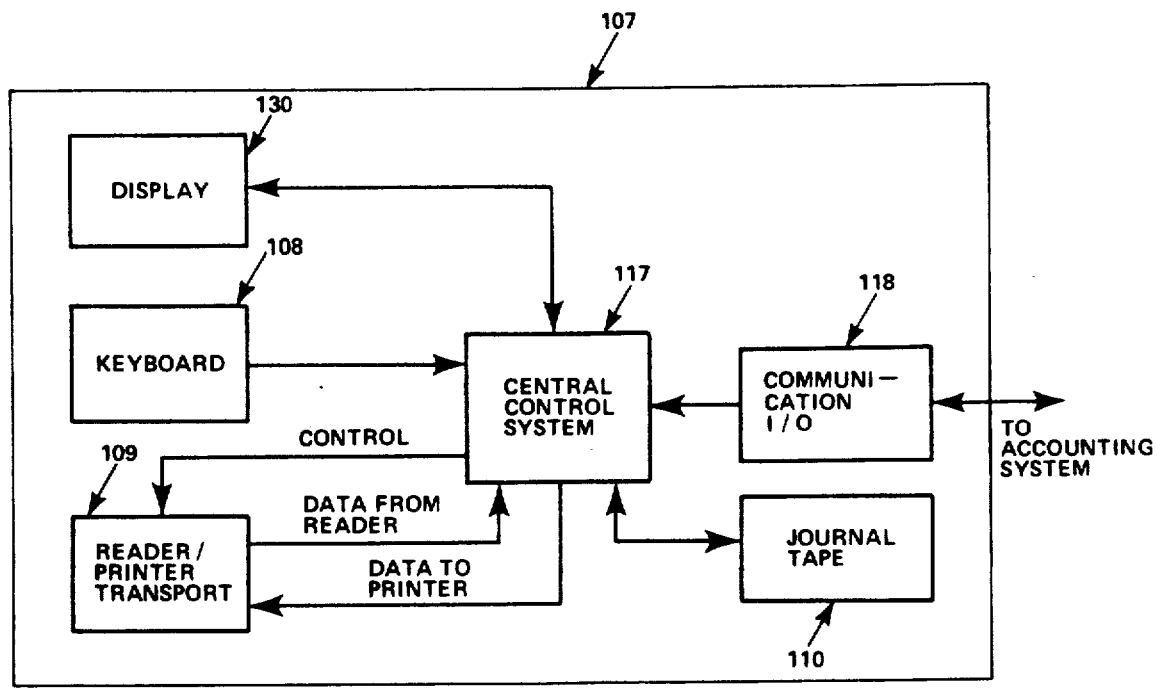

REEXAMINATION CERTIFICATE ISSUED UNDER 35 U.S.C. 307

THE PATENT IS HEREBY AMENDED AS INDICATED BELOW.

AS A RESULT OF REEXAMINATION, IT HAS BEEN DETERMINED THAT:

Claims 1-9 are cancelled.

* * * * *